July 2, 1929.  R. L. LANSING  1,719,707
ANTIGLARE DEVICE
Filed April 24, 1926
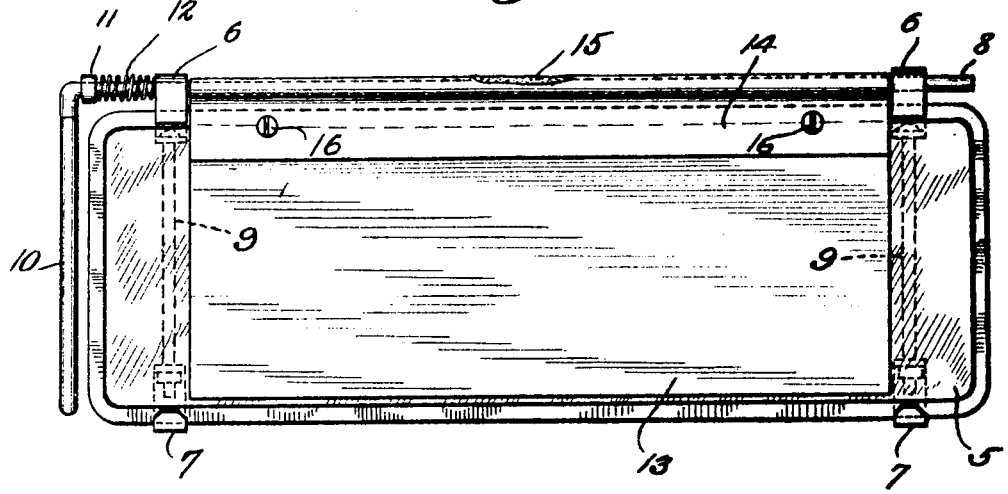
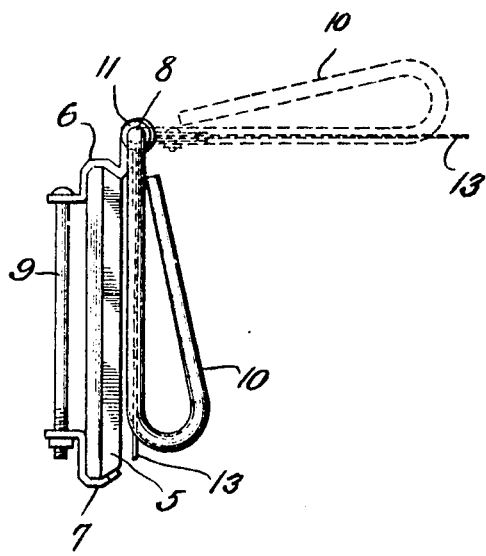 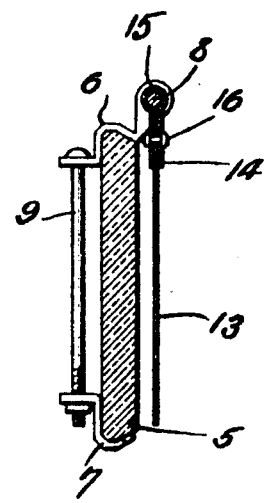
Roy L. Lansing
Inventor, Patented July 2, 1929.

1,719,707

UNITED STATES PATENT OFFICE.

ROY L. LANSING, OF ARLINGTON, OHIO.

ANTIGLARE DEVICE.

Application filed April 24, 1926. Serial No. 104,419.

This invention relates to an attachment for use in connection with mirrors employed by drivers of motor vehicles for observing the road, and vehicles approaching from the rear, the primary object of the invention being to provide means to guard the eyes of the operator against the glare of the headlights of motor vehicles approaching from the rear and reflected in the mirror.

An important object of the invention is to provide a device of this character which will be readily and easily secured to the usual mirror employed on motor vehicles, eliminating the necessity of making changes in the mirror construction to apply the device.

A still further object of the invention is to provide a device of this character which may be cheaply manufactured and one which will be durable and efficient in operation, to the end that although the glare of the headlights of automobiles will be eliminated, the operator may still view the road through the mirror.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a front elevational view of a device constructed in accordance with the invention.

Figure 2 is an end elevational view of a mirror showing the attachment as applied.

Figure 3 is a vertical sectional view through the mirror and attachment.

Referring to the drawing in detail, the reference character 5 indicates a mirror which is of the usual and well known construction, the same being of the type secured to the upper edges of windshields so that the road at the rear of the vehicle may be viewed by the operator.

The device forming the essence of the invention includes clamping members 6 and 7 respectively, the clamping members 6 being arranged with bearing openings for the reception of the rod 8 adapted to move therein.

Rods 9 have connection with the clamping members and are adapted to move the clamping members into close engagement with the upper and lower edges of the mirror to which the attachment is secured.

One end of the rod 8 is extended at right angles and bent upon itself to provide a handle 10, there being provided a collar 11 secured on the rod and providing an abutment for one end of the coiled spring 12 that has its opposite end engaging the bracket member 6 associated therewith to normally exert an outward pull on the rod to set up a binding action and hold the rod in its positions of adjustment.

The body portion of the device which is indicated at 13 is in the form of a strip of translucent material having one edge thereof disposed between the flanges 14 of the securing member which in turn is positioned around the rod 8 and formed with a cut out portion to accommodate a suitable securing medium such as solder or the like indicated at 15.

Screws 16 pass through the flanges of the securing member and act to draw the flanges into close engagement with the member 13 to secure the member 13 between the flanges.

From the foregoing it will be obvious that due to the construction shown and described, the handle 10 may be moved to various positions to bring the translucent member 13 to a position directly over the mirror or to a position above the mirror for daytime running.

When the member 13 is moved over the mirror reflection in the mirrow caused by the headlights of motor vehicles approaching from the rear is eliminated to the comfort of the driver.

I claim:—

An anti-glare device including pairs of clamping members to be clamped to a supporting structure, one of the clamping members of each pair being formed into an upwardly extending bearing, a rod extending through the bearings and having one of its ends bent laterally defining a handle, a securing member secured to the rod, the securing member being of a width equal to the distance between the bearings to engage the bearings and restrict lateral movement of the securing member, a collar on the rod, a coiled spring on the rod and engaging the collar and one of the bearings to exert a lateral pressure on the rod to cause one edge of the securing member to frictionally engage one of the bearings to restrict movement of the securing member, and a translucent member secured to the securing member to overlie the supporting structure.

In testimony that I claim the foregoing as my own, I have hereto affixed my signature.

ROY L. LANSING.